United States Patent
Zalesski

[11] Patent Number: 5,912,542
[45] Date of Patent: Jun. 15, 1999

[54] VARIABLE LOAD INDUCTANCE COMPENSATION FOR MOTOR DRIVE CIRCUITS

[75] Inventor: Andrew Zalesski, Apalachin, N.Y.

[73] Assignee: Universal Instruments Corporation, Binghamton, N.Y.

[21] Appl. No.: 08/816,004

[22] Filed: Mar. 10, 1997

[51] Int. Cl.⁶ .................................................. H02P 8/00
[52] U.S. Cl. .......................... 318/701; 318/727; 318/718
[58] Field of Search ................................ 318/790–838, 318/701, 718, 139, 138, 245, 254, 439, 715

[56] References Cited

U.S. PATENT DOCUMENTS

| | | | |
|---|---|---|---|
| 4,237,531 | 12/1980 | Cutler et al. | |
| 4,595,865 | 6/1986 | Jahns. | |
| 4,868,478 | 9/1989 | Hedlund et al. | 318/696 |
| 5,043,643 | 8/1991 | Hedlund et al. | 318/254 |
| 5,227,709 | 7/1993 | Gauthier et al. | 318/685 |
| 5,274,287 | 12/1993 | Bahn | 310/68 B |
| 5,278,482 | 1/1994 | Bahn | 318/701 |
| 5,311,069 | 5/1994 | Austin | 307/262 |
| 5,313,149 | 5/1994 | Bahn | 318/727 |
| 5,319,297 | 6/1994 | Bahn | 318/701 |
| 5,384,524 | 1/1995 | Romano | 318/569 |
| 5,627,444 | 5/1997 | Fulks | 318/701 |
| 5,654,840 | 8/1997 | Patton et al. | 360/75 |
| 5,696,412 | 12/1997 | Iannello | 310/90.5 |

FOREIGN PATENT DOCUMENTS 2-202392  8/1990  Japan.

*Primary Examiner*—Paul Ip
*Attorney, Agent, or Firm*—Banner & Witcoff, Ltd.

[57] ABSTRACT

The apparatus includes a motor control circuit including an amplifier with an inductance compensation circuit responsive to a motor, such as a switched reluctance motor, having inductance variations. The inductance compensation circuit includes at least two inductance compensation values and switching means for alternatingly coupling and decoupling at least one of the inductance compensation values from the inductance compensation circuit providing at least first and second inductance compensation for driving the motor in response to variations in the inductance of the motor.

12 Claims, 5 Drawing Sheets

VARIABLE LOAD INDUCTANCE COMPENSATION FOR MOTOR DRIVE CIRCUITS

TECHNICAL FIELD

The invention relates to motor control circuits and, in particular, to an improved circuit for dynamic inductance compensation of a motor drive circuit.

BACKGROUND OF THE INVENTION

Conventionally, commercially available servo amplifiers operate properly over a limited-load inductance range. Typically, the load inductance range may only be changed manually by substituting one or more inductance compensation values, e.g., one or more capacitors and/or resistors. The predetermined inductance compensation value allows the servo amplifier to operate over one inductance range at any given time. The above-described arrangement works well for motors which have a limited or constant load-inductance range. For example, the above-described arrangement works well for permanent magnet servo motors which operate in the linear characteristic region of the magnetic, e.g., in a region below magnetic saturation of the core. However, a problem arises in motors which operate both in a region where the cores are in magnetic saturation and where the cores are not in saturation or in motors where the inductance varies widely, e.g., in switch-reluctance motors.

Referring to FIGS. 5 and 6, it can be demonstrated that the step response of commercially available, single-load range, servo amplifiers is unsatisfactory when utilized with variable reluctance motors. Specifically, FIG. 5 shows the step response of a servo amplifier (i.e., a Model 432 DC Brush Servo Amplifier from Copley Controls Corporation, Westwood, Mass.) configured with an inductance compensation resistor of 200 kΩ and operated with a switched reluctance motor. Although the 200 kΩ inductance compensation resistor is suitable for operation of a motor in the unsaturated inductance condition, at current values above the saturation point, the low inductance is not compensated properly. In this configuration, as shown in FIG. 5, the voltage step of the amplifier input 100 results in a voltage step at the motor coil current 101 displaying oscillations.

Similarly, FIG. 6 shows the amplifier step response with the induction compensation resistor, e.g., an 18 kΩ resistor selected for operation with a saturated inductance. Although an 18 kΩ inductance compensation resistor eliminates the above described oscillation, the rise time response of the motor coil current 102 is adversely affected. For example, the rise time response of the servo amplifier, configured with the 18 kΩ inductance compensation resistor, is approximately twice the rise time associated with the amplifier configured with the 200 kΩ inductance compensation resistor. Although the oscillations may be prevented by reducing the value of the inductance compensation components, motor performance is adversely affected such that the maximum motor speed for a given motor force is reduced by a factor proportional to the increase in the rise time. Accordingly, conventional arrangements for inductance compensation of commercially available servo amplifiers are unsatisfactory.

SUMMARY OF THE INVENTION

Objects of the invention include providing an apparatus and a method for configuring and operating servo amplifiers to improve the performance of motors which have a variable inductance.

The invention includes a load (such as a switch-reluctance motor) having first and second inductance values. A servo amplifier is coupled to and drives the load. The servo amplifier has an inductance compensation circuit which varies the drive characteristics of the servo amplifier in accordance with variations in the inductance value of the load. The inductance compensation circuit may vary the drive characteristics of the amplifier by monitoring the current in the motor coil.

The invention also includes a method of controlling a motor comprising varying drive characteristics of an amplifier circuit coupled to the motor in response to variations in the inductance of the motor.

The invention also include a method of alternatingly switching between first and second amplification values of an amplifier in a feedback control system for driving a switched reluctance motor in response to variations in the inductance of the motor.

One aspect of the invention includes a motor having a core and a coil disposed about the core. The motor is configured to operate with a first inductance value when the core is in a saturated condition, and with a second inductance value when the core is in a non-saturated condition. An amplifier is coupled to the motor. The amplifier includes means for suppling a drive current to the motor and means for monitoring inductance variations in the core. An inductance compensation circuit is coupled to the servo amplifier to provide variable inductance compensation. The inductance compensation circuit includes switching means for switching between first and second compensation values responsive to the motor switching between the first and second inductance values, respectively.

In another aspect, the invention includes a motor control circuit having a servo amplifier and an inductance compensation circuit. The servo amplifier has an inductance compensation control input coupled to the inductance compensation circuit. The inductance compensation circuit includes at least a first inductance compensation component and switching means for alternately coupling and decoupling the first inductance compensation component and the inductance compensation input.

In yet another aspect, the invention includes a method of driving a switched reluctance motor with a servo amplifier having an inductance compensation input. The method includes periodically varying an inductance compensation value applied to the inductance compensation input responsive to variations in the inductance of the motor.

Although the invention has been described, in general, in the "Summary Of The Invention" section, it should be noted that the invention includes any of the components, functions, and/or methods described, claimed, and/or shown herein when used in any combination or subcombination. Accordingly, there are any number of alternate combinations for defining the invention which combine one or more elements from the existing claims and/or from the specification in various combinations or subcombinations.

Figure 3:
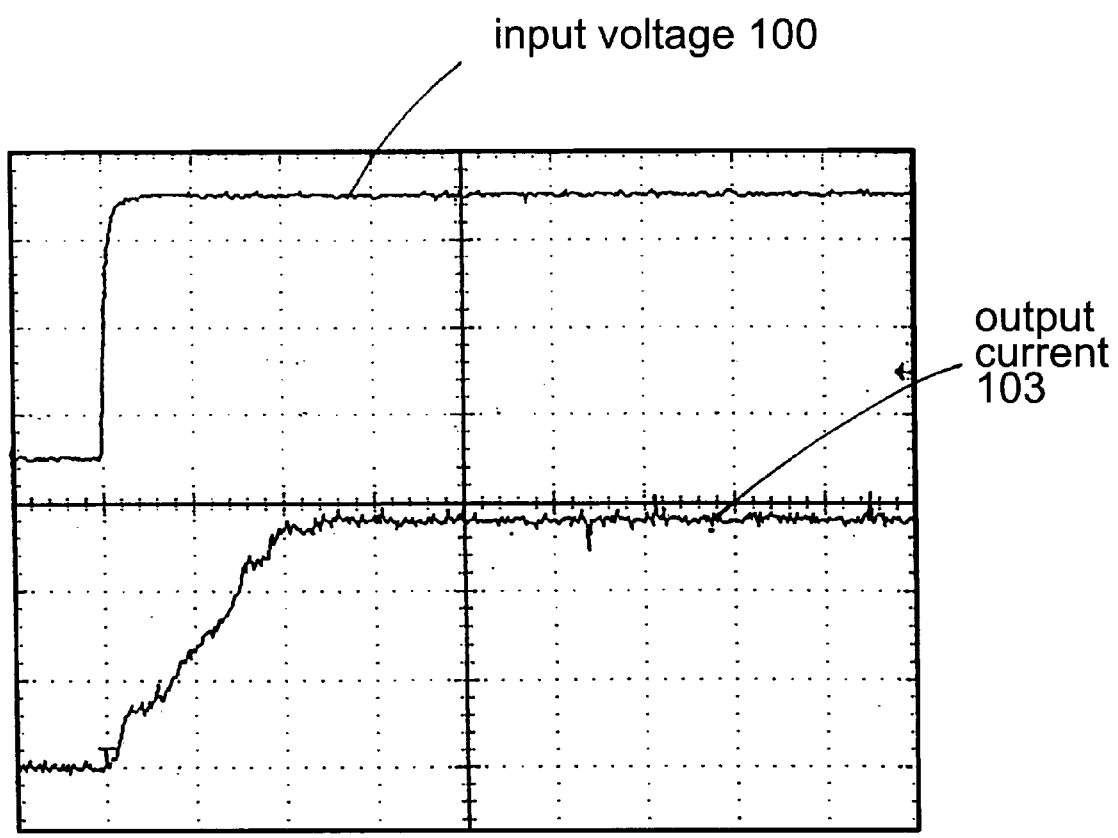
Figure 5:
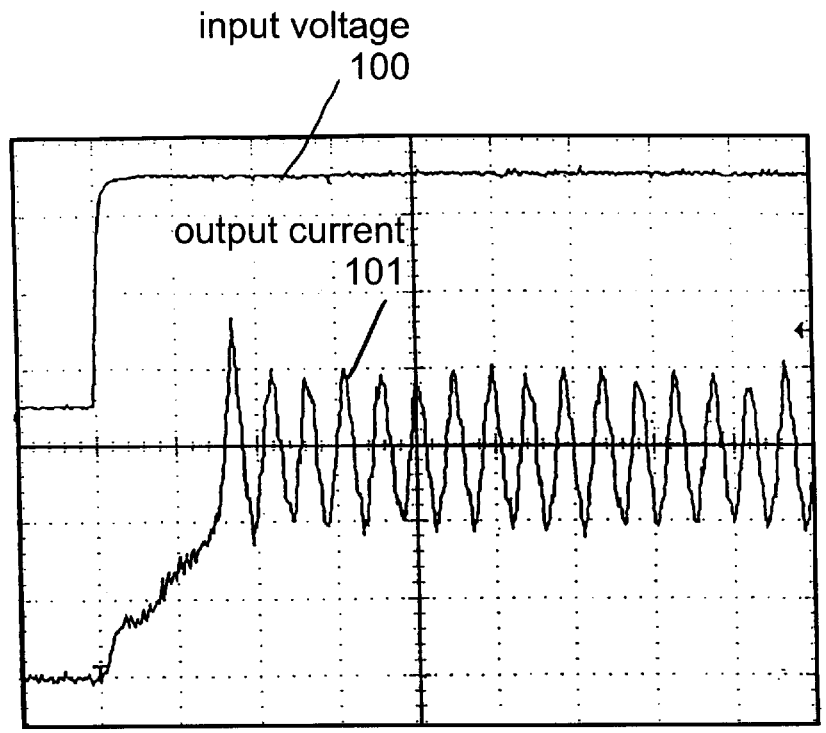
Figure 6:
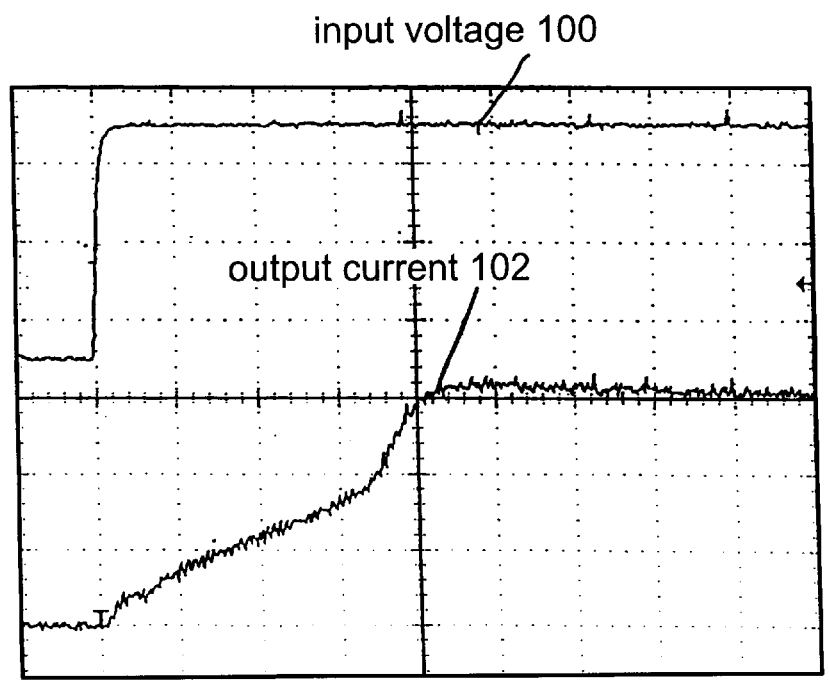

FOGS. 2a–2c, respectively, illustrate motor coil inductance, current monitor output voltage, and load-conductance compensation resistance as a function of coil/motor current;

FIG. 3 shows a step response of a servo amplifier configured with a dynamic inductance compensation circuit in accordance with the present invention;

FIG. 4a is a block diagram of a variable reluctance motor control system in accordance with aspects of the present invention;

FIG. 5 is a graphic representation of a step response of a servo amplifier compensated with a resistor selected for operation in an unsaturated inductance region; and FIG. 6 is a graphic representation of a step response of an amplifier configured with an inductance compensation resistor for operation in a saturated inductance region.

DETAILED DESCRIPTION OF THE INVENTION

Figure 1:
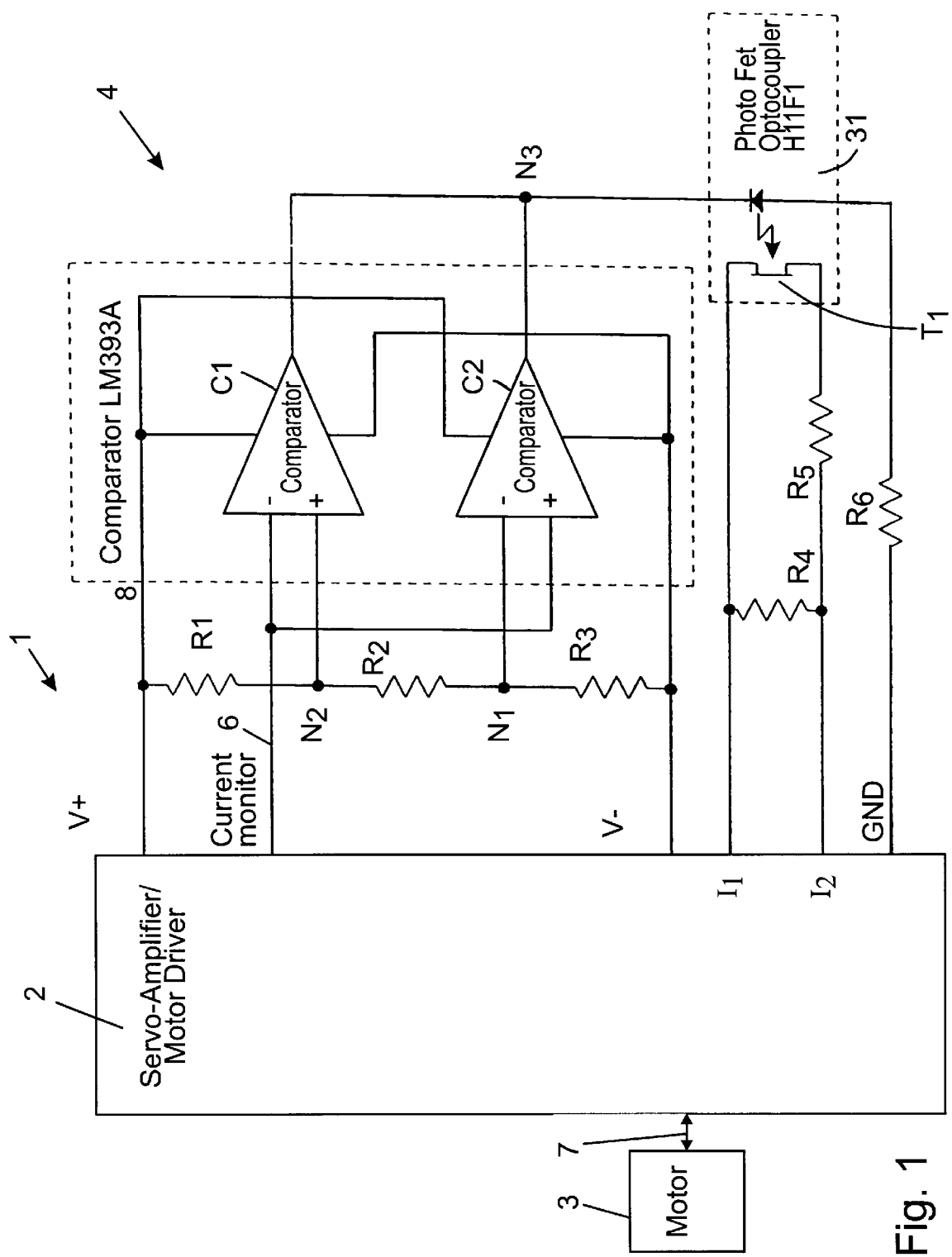
FIG. 1 is a partial circuit and partial block diagram of a servo amplifier coupled to a motor and a dynamic inductance compensation circuit.

Referring to FIG. 1, a variable reactance motor control system 1 may include a amplifier 2, e.g., a servo amplifier/motor drive circuit, coupled to an inductance compensation circuit 4. The amplifier 2 is most preferably a Model 432 DC Brush Servo Amplifier from Copley Controls Corporation. The amplifier 2 is preferably coupled to a motor 3. The motor 3 may be variously configured. In preferred embodiments, the motor 3 may include any suitable arrangement where the motor operates with a phase inductance which varies widely. In the most preferred embodiments, the motor 3 includes a switch reluctance motor.

The inductance compensation circuit 4 is coupled to the amplifier 2 to dynamically vary the response characteristics of the amplifier 2 in response to changes in the reactance of the motor 3. Although the amplifier 2 may be variously configured, in the most preferred embodiments, the amplifier 2 includes a current monitor output 6 responsive to the output current of the amplifier 2. The amplifier 2 may also include a positive reference voltage V+ and a negative reference voltage V−. In the most preferred embodiments, the positive reference voltage V+ is set at approximately positive 15 volts, and the negative reference voltage V− is set at approximately negative 15 volts. The amplifier 2 most preferably includes one or more inductance compensation inputs I1 and I2. In the most preferred embodiments, the inductance compensation inputs adjust the amplifier and/or driver output 7 to compensate for different core inductances in the motor 3. Although the inductance compensation circuit 4 is shown separately from amplifier 2, it may also be incorporated into the amplifier assembly.

In one preferred embodiment, first and second comparators C1, C2 are utilize to discriminate between a saturated and an unsaturated operating condition of motor 3. For example, as shown in FIG. 1, the current monitor output 6 of the amplifier 2 may be input into the negative input of comparator C1 and into the positive input of comparator C2. A voltage divider comprising resistors R1, R2, and R3, connected between the positive reference voltage V+ and the negative reference voltage V−, supplies fixed reference voltages to the comparators. In particular, node N1, between resistors R2 and R3, provides the negative input to comparator C2, and node N2, between resistors R1 and R2, provides the positive input to comparator C1. The voltage divider may be variously configured, but, in the most preferred embodiment, is set such that the voltage at node N2 is a positive two volts and the voltage at N1 is a negative two volts. The output of comparators C1 and C2 is preferably configured as an open collector output and coupled together at node N3. The output at node N3 is then fed back into amplifier 2, via a switch 31, controlling the impedance input at the load-inductance compensation inputs I1 and I2. In the most preferred embodiment, switch 31 controls the resistance applied to the load-inductance compensation inputs I1, I2. For example, resistors R4 and R5 may be selectively coupled in parallel via optocoupler switch T1. In exemplary embodiments, R4 may be 200 KΩ and R5 may be 18 KΩ. Accordingly, the impedance of the load-inductance compensation input may be varied by switching transistor T1 on and off. Although resistors are shown for exemplary purposes, any capacitance and/or resistance network may be utilized, either in addition to or instead of the illustrated resistance network. Further, other inductance modification circuits will be apparent to those skilled in the art. In the most preferred embodiment, resistor R4 is matched to provide optimal inductance compensation for a motor operated in an unsaturated phase inductance, i.e., at a low current below the core saturation point. Additionally, resistor R5 is matched for optimum performance of the amplifier 2 for the saturated phase inductance condition for current values above the core saturation point.

Where an optocoupler having an LED is utilized for switch 31, it may be preferable to utilize a resistor R6 as a current limiting resistor for the LED.

Figure 2A:
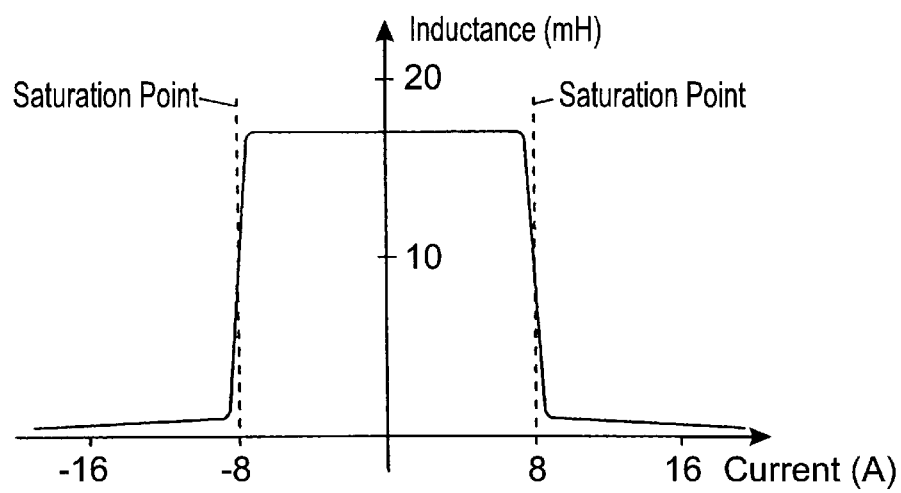
Figure 2B:
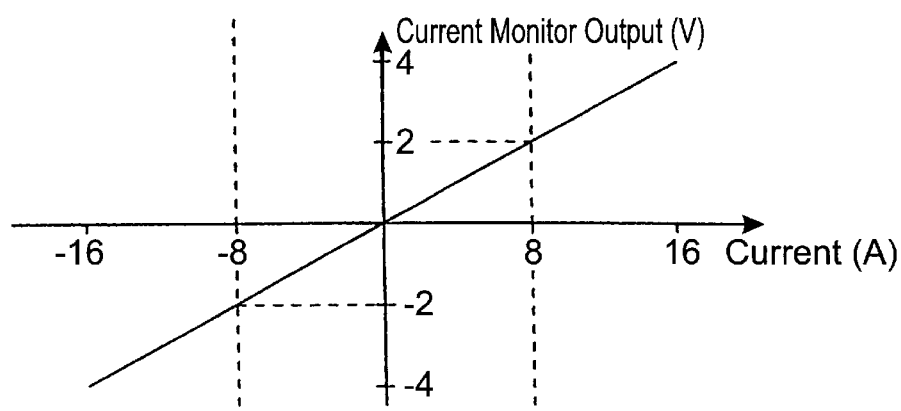
Figure 2C:
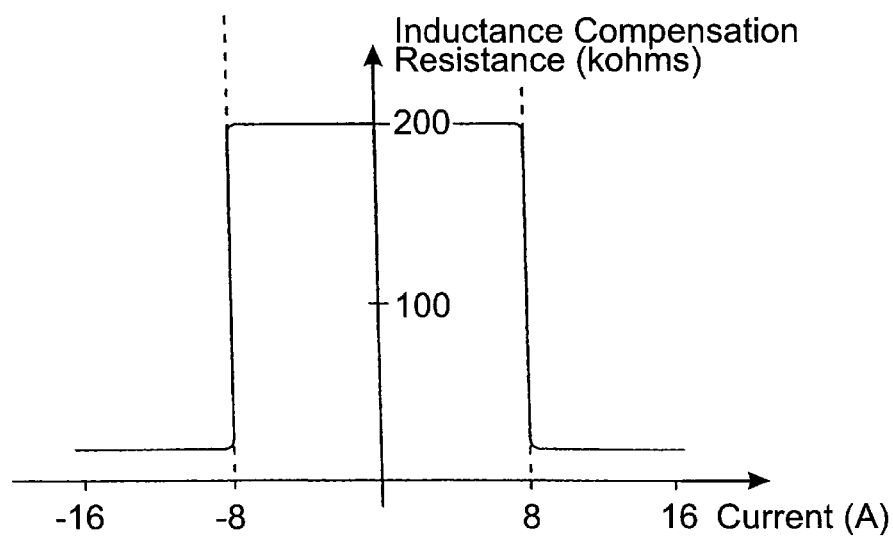

In operation, the amplifier 2 drives the motor 3, with the current monitor signal from amplifier 2 being proportional to the phase current delivered to the motor 3. Referring to FIGS. 2a–2c, as the phase current magnitude increases (FIG. 2a), the voltage of the current monitor output also increases proportionally. When the phase current magnitude increases above the saturation point, the voltage at the comparator outputs drops to the negative voltage bias position, e.g., −15 volts. Accordingly, switch 31 is activated, switching resistor R5 in parallel with resistor R4. As a result, the load-inductance compensation resistor is reduced by approximately an order of magnitude. FIGS. 2a–2c shows an example where the resistor R4 is set to be 200 kΩ and resistor R5 is set to be 18 kΩ. At current values below the core saturation range, switch 31 is turned off and the load-inductance compensation resistor is again controlled by resistor R4.

With reference to FIG. 3, it can be seen that the output current 103 response for the circuits of FIG. 1 is significantly improved over the output current 101 and 102 response obtained in FIGS. 5 and 6. For example, in FIG. 3, the oscillations present in FIG. 5 are eliminated, and the slow response time shown in FIG. 6 is also eliminated. Accordingly, the dynamic response of the control system shown in FIG. 1 is significantly improved over the response of the conventional control system shown in FIGS. 5 and 6.

Figure 4:
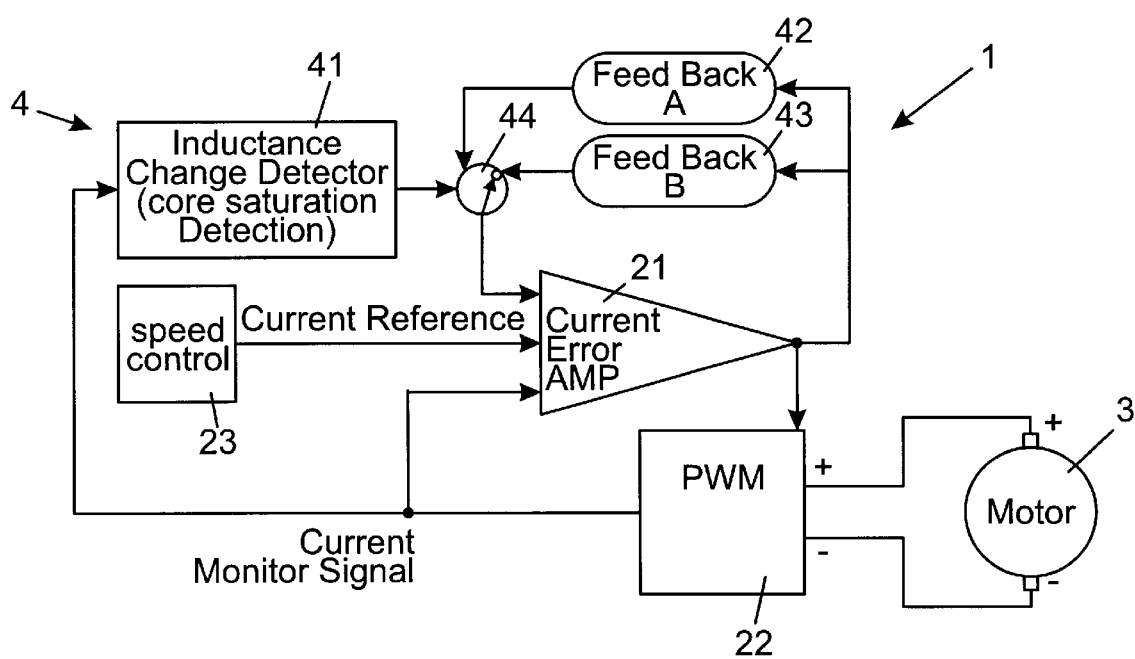

FIG. 4 shows the embodiment of the present invention in block diagram form, including the amplifier circuitry. Motor 3 is driven by a pulse width modulator (PWM) 22. The pulse width modulator 22 is controlled by the output of current error amp 21. The pulse width modulator 22 also outputs a current monitor signal which has a voltage proportional to a current in the motor 3. For example, the current monitor signal may be obtained by measuring a voltage across a resistor connected in parallel and/or series with motor 3. The current monitor signal may then be fed back into current error amplifier 21 and compared with a current reference signal. The difference between the current reference signal and the current monitor signal may be amplified by amplifier 21 and output back into the pulse width modulator 22 to complete the feedback loop. The amplification factor of current error amplifier 21 is controlled by a feedback circuit, e.g., feedback circuit A 42 and feedback circuit B 43. Switch 44 controls two or more feedback control circuits disposed in conjunction with current error amplifier 21. Inductance change detector 41 determines when the inductance of the motor has changed. The inductance change detector 41 is most preferably operated with a motor where the inductance changes between two distinct states, e.g., a saturated core condition and an unsaturated core condition. The inductance change detector 41 controls switch 44 to alternatingly switch in and out feedback network A or B in response to changes in the inductance of motor 3.

Feedback circuits A and B may be variously configured to include any suitable feedback control arrangement. In preferred embodiments, feedback circuits A and B comprise a resistor and capacitor coupled in a series circuit which is, in turn, coupled in parallel with a bypass capacitor. For example, in the most preferred embodiments, feedback circuit A comprises a 200 kΩ resistor coupled in series with a 47 nF capacitor to form a series circuit which is, in turn, coupled in parallel with a 470 pF capacitor. Additionally, in the most preferred embodiments, feedback circuit B comprises an 18 kΩ resistor coupled in series with a 47 nF capacitor to form a series circuit which is, in turn, coupled in parallel with a 470 pF capacitor. Various other feedback arrangements will be apparent to those skilled in the art. An advantage of the two step feedback control arrangement is that the amplification of the amplifier can be closely tailored to meet the requirements of motors, such as linear motors, which switch between first and second inductance states. The switch feedback arrangement has been found to be particularly effective in optimizing the motor drive circuits in linear motors.

The current error amplifier 21 may be any suitable arrangement. In the most preferred embodiments, the current error amplifier 21 may be configured in the same manner as the current error amplifier shown in Copley Controls Corporation's Model 432 DC Brush Servo Amplifier.

The speed control 23 may be any suitable speed control which provides a current reference output.

The inductance change detector 41 may be configured as shown in FIG. 1 and may include the first and second comparators C1, C2 and the voltage divider comprising resistors R1–R3. Alternatively, the inductance change detector 41 may comprise any suitable detection mechanism (including an optical or magnetic sensor) which outputs a signal that varies in accordance with inductance changes in motor 3.

Switch 44 may switch between two alternate feedback circuits, or it may be configured to switch in or out one or more inductance-compensation components in a single feedback circuit, as shown in FIG. 1. The switch 44, in conjunction with feedback circuits A and B, forms a dynamic inductance compensation circuit. Inductance change detector 41 forms a means for monitoring inductance variations. Of course, alternative arrangements will be apparent to those skilled in the art. For example, the monitoring means may be an external sensor. Additionally, rather than switching the feedback network associated with an amplifier, a second amplifier may be alternatingly switched with a first amplifier. Further, the inductance compensation may occur directly in the pulse width modulator circuit 22.

The amplifier 21, in conjunction with the motor 3 and pulse width modulator 22, forms a feedback loop which controls the voltage across the motor, and hence the current in the motor. Modifying the amplification factor in the current error amplifier 21 allows the amplification factor to be matched to the value of the inductance in the motor as the inductance changes between first and second values. The larger the inductance, the longer it will take for current to change in the motor 3 (load). Accordingly, a higher amplification factor is required for a larger inductance of motor 3. However, where the inductance of motor 3 decreases to the lower value, the higher amplification required for the higher inductance values may cause oscillation. Alternatively, if a lower amplification factor is utilized, at higher inductance values, the rise time may be too large. Accordingly, the embodiments of the invention switch between two amplification values to optimize the feedback control system for a switched reluctance motor. As the inductance increases to the higher value, an increase in the gain of the current error amplifier 21 produces a larger voltage across the load, decreasing the response time of the control system. The rate of change of current in an inductor in the motor 3 is proportional to the voltage across the inductance. Accordingly, as the inductance changes to the lower value, the motor control system 1 switches to the lower amplification factor to decrease the voltage across the inductor.

While one control system embodying the present invention is shown, it will be understood, of course, that the invention is not limited to this embodiment. Modifications may be made by those skilled in the art, particularly in light of the foregoing teachings. It is, therefore, intended that the appended claims cover any such modifications which incorporate the features of this invention or encompass the true spirit and scope of the invention. For example, in the illustrated embodiment, the load-inductance compensation circuit may be variously configured to include any Parallel and/or serial connection of resistors and capacitors, coupled in an appropriate way to a suitable amplifier and/or motor-driving circuit. Further, the circuit monitoring changes in the motor 3 are not limited to the current monitor circuit, and may include any number of monitoring mechanisms and suitable control logic for controlling switch 31. Additionally, switch 31 may be configured in any number of ways well known to those skilled in the art.

What is claimed is:

1. An apparatus comprising:
   a motor having a core and a coil disposed about the core, the motor being configured for operating with a first inductance value when the core is in a saturated condition and with a second inductance value when the core is in a non-saturated condition;
   an amplifier coupled to the motor, the amplifier being configured for supplying a controlled drive current to the motor and for indicating the inductance of the coil; and
   an inductance compensation circuit, connected to said amplifier, for providing inductance compensation, the inductance compensation circuit including
   an inductance change detector being configured to detect variations in the inductance of the coil; and
   a switch for switching between at least first and second inductance compensation values responsive to predetermined coil inductance variations.

2. The apparatus of claim 1 wherein the amplifier is further configured to provide a current monitor output and receive a load inductance compensation control input, the inductance compensation circuit being coupled to and controlled by the current monitor output for alternately applying the first and second inductance compensation values to the load-inductance compensation control input.

3. The apparatus of claim 1 wherein the inductance change detector is configured for monitoring a current in the coil.

4. The circuit of claim 1 wherein the amplifier varies an amount of amplification responsive to the core being in a saturated condition.

5. An apparatus comprising a motor control circuit including an amplifier connected to an inductance compensation circuit responsive to a motor having inductance variations, the inductance compensation circuit including at least first and second inductance compensation components and being configured for alternately coupling and decoupling at least one of the inductance compensation components from the inductance compensation circuit.

6. The apparatus of claim 5 further comprising a current monitor signal, the first inductance compensation component being connected to the inductance compensation circuit responsive to the current monitor signal having a first value and disconnected from the inductance compensation circuit responsive to the control monitor signal having a second value different from the first value.

7. A method comprising:

detecting variations in the inductance of a motor;

alternatingly switching between at least first and second amplification values of an amplifier in a feedback control system responsive to the variations detected in the monitor; and providing inductance compensation to the motor responsive to the amplification values.

8. The method of claim 7 wherein alternatingly switching includes detecting a saturation condition in a core of the motor and alternatingly the amplification of the amplifier in response to the saturation condition detected.

9. The method of claim 8 wherein alternatingly switching includes decreasing an amplification of the amplifier when the core of the motor is in a saturation condition.

10. An apparatus, comprising:

an inductance change detector, configured to detect the inductance of a coil in a motor connected to said apparatus;

an error amplifier;

a first feedback circuit;

a second feedback circuit; and a switch, connected to said inductance change detector, said error amplifier, and said first and second feedback circuits, being configured for alternately connecting one of said feedback circuits to said error amplifier in response to the motor coil inductance level detected by said inductance change detector.

11. The apparatus of claim 10, further comprising:

a pulse width modulator, connected to said error amplifier and said inductance detector, configured to supply a motor drive current to a motor connected to said apparatus; and further configured to supply a current monitor signal to said inductance change detector and said error amplifier.

12. The apparatus of claim 11, further comprising a speed control, connected to said error amplifier, configured to provide a current reference output to said error amplifier.

* * * * *